United States Patent
Park et al.

(10) Patent No.: US 8,005,182 B2
(45) Date of Patent: Aug. 23, 2011

(54) APPARATUS AND METHOD OF COMPENSATING FOR FREQUENCY OFFSET IN OFDMA SYSTEM

(75) Inventors: Hyeong-Sook Park, Daejeon (KR); Jun-Woo Kim, Daejeon (KR); Kyung-Yeol Sohn, Daejeon (KR); Youn-Ok Park, Daejeon (KR)

(73) Assignees: Electronics and Telecommunications Research Institute, Daejeon (KR); Samsung Electronics Co., Ltd., Suwon-si (KR)

( * ) Notice: Subject to any disclaimer, the term of this patent is extended or adjusted under 35 U.S.C. 154(b) by 970 days.

(21) Appl. No.: 11/925,686

(22) Filed: Oct. 26, 2007

(65) Prior Publication Data

US 2008/0137768 A1    Jun. 12, 2008

(30) Foreign Application Priority Data

Dec. 8, 2006   (KR) .......................... 10-2006-0124586

(51) Int. Cl.
*H03D 3/24* (2006.01)
(52) U.S. Cl. ......... 375/373; 375/260; 375/344; 370/208
(58) Field of Classification Search .................. 375/260, 375/344, 373; 370/203–211
See application file for complete search history.

(56) References Cited

U.S. PATENT DOCUMENTS

| 2004/0037376 A1* | 2/2004 | Higure ........................... 375/344 |
| 2004/0141457 A1* | 7/2004 | Seo et al. ...................... 370/203 |
| 2004/0264584 A1* | 12/2004 | Labs et al. .................... 375/260 |

FOREIGN PATENT DOCUMENTS

| KR | 10-2003-0042377 A | 5/2003 |
| KR | 1020060067034 A | 6/2006 |
| WO | 00/77961 A1 | 12/2000 |

OTHER PUBLICATIONS

Jungho Noh, Taehyoung Sun and Kyunghi Chang, "Algorithm for the Improvement of Time and Frequency Synchronization Performance in OFDMA System", Apr. 2006, pp. 402-411, vol. 31, No. 4A.

* cited by examiner

*Primary Examiner* — Curtis Odom
(74) *Attorney, Agent, or Firm* — Jefferson IP Law, LLP (57) ABSTRACT

The present invention relates to an apparatus and method of compensating for a frequency offset in an orthogonal frequency division multiple access system that is capable of efficiently estimating and compensating for the frequency offset. A receiver of the orthogonal frequency division multiple access system can individually estimate a fractional frequency offset and an integer frequency offset by using a downlink preamble signal. Further, the receiver can compensate for the frequency offset by adding the integer frequency offset once after completely compensating for the fractional frequency offset. Therefore, it is possible to efficiently compensate for the frequency offset.

13 Claims, 8 Drawing Sheets

APPARATUS AND METHOD OF COMPENSATING FOR FREQUENCY OFFSET IN OFDMA SYSTEM

CROSS-REFERENCE TO RELATED APPLICATION

This application claims priority to and the benefit of Korean Patent Application No. 10-2006-0124586 filed in the Korean Intellectual Property Office on Dec. 8, 2006, the entire content of which is incorporated herein by reference.

BACKGROUND OF THE INVENTION (a) Field of the Invention

The present invention relates to an apparatus and method of compensating for a frequency offset in an orthogonal frequency division multiple access system.

(b) Description of the Related Art

In general, wireless communication systems have been developed to transmit desired data using a predetermined frequency. The wireless communication systems are divided into a plurality of types of systems. Typical wireless communication systems are mobile communication systems, which are largely divided into synchronous mobile communication systems and asynchronous mobile communication systems.

A mobile communication system uses a method in which data is transmitted after multiplying a carrier signal of a predetermined frequency band by a code having orthogonality. In an IEEE 802.11 or 802.16 system, data is transmitted by using a technology according to an orthogonal frequency division multiplexing (OFDM) method or an orthogonal frequency division multiple access (OFDMA) method. In the system that uses the OFDM or OFDMA method, after data of a bit unit to be transmitted is converted into an OFDM symbol, the OFDM symbol is carried to a predetermined carrier signal and transmitted.

According to the structure of the OFDMA transmission system, the OFDMA transmission system is largely divided into a transmitter and a receiver. The transmitter converts raw data of a bit unit to be transmitted into a symbol, and carries the symbol to a high frequency so as to transmit it. The receiver receives the symbol that is transmitted by the transmitter and restores the raw data of a bit unit that is transmitted by the transmitter. The receiver of the OFDMA system estimates a frequency offset by using a preamble signal during a downlink, and compensates for a received signal on the basis of the estimated frequency offset.

In a wireless communication environment, such as the OFDMA system, the frequency offset occurs due to the relative difference of an oscillator between the transmitter and the receiver, that is, between a base station and a terminal, and a Doppler frequency that is generated when the terminal moves. In a system that uses a single frequency, the frequency offset reduces only a signal-to-noise ratio (SNR) of a received signal. However, in a system such as the OFDMA system that uses a multi-carrier, in addition to the reduction of the SNR of the received signal, inter-carrier interference (ICI) is caused to occur. Accordingly, research on synchronization to compensate a carrier frequency offset in a system using a multi-carrier as in the OFDMA system has been actively performed.

A method using a preamble, which is one of the methods of compensating for a frequency offset in an OFDMA system in the related art, estimates a frequency offset by using a repetition characteristic of a guard interval. In this method, a range of a frequency offset that can be estimated is limited to less than half of a subcarrier frequency interval. As a result, it is needed to provide a separate structure for estimating a frequency offset in a frequency offset range that is not less than half of the subcarrier frequency interval.

That is, in an OFDMA system such as an IEEE 802.16e or WiBro OFDMA system that uses a downlink preamble, a frequency is estimated by using a characteristic that the preamble signal is repeated in a time domain in order to compensate for a fractional frequency offset and an integer frequency offset. At this time, if the number of times the preamble signal is repeated in the time domain is M, since M is 3 in the WiBro OFDMA system, the frequency offset needs to be compensated by 1.5 times as much as the subcarrier frequency interval. However, the preamble signal is not repeated in an actual time domain three times.

Accordingly, in the WiBro OFDMA system, a frequency is estimated by using a repetitive characteristic in a guard interval of the preamble instead of a repetitive pattern of the preamble signal. Since a range of a frequency offset that can be estimated is limited to less than half of a subcarrier frequency interval, it is needed to provide a separate structure that estimates a frequency offset in a frequency offset range that is not less than half of the subcarrier frequency interval.

Examples of a method of compensating for a frequency offset in the OFDMA system according to the related art include methods of estimating and compensating for fractional and integer frequency offsets. However, a method is not described in which the receiver of the OFDMA system efficiently compensates for fractional and integer frequency offsets after efficiently estimating the fractional and integer frequency offsets.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method of compensating for a frequency offset of an OFDMA system, having advantages of efficiently estimating a fractional frequency offset and an integer frequency offset.

An exemplary embodiment of the present invention provides a method of estimating a frequency offset for a downlink frame. The method includes estimating a fractional frequency offset and an integer frequency offset of a received signal, compensating for the estimated fractional frequency offset and determining whether the integer offset is completely estimated, compensating for the integer offset on the basis of the compensated fractional frequency offset when the integer offset is completely estimated, and compensating for an entire frequency offset for the received signal on the basis of the compensated result.

Another embodiment of the present invention provides an apparatus for compensating for a frequency offset. The apparatus includes a first frequency offset estimator that estimates a first frequency offset; a second frequency offset estimator that estimates a second frequency offset; a calculator that adds the first frequency offset and the second frequency offset to be estimated; a switch that is located between the second frequency offset estimator and the calculator and switches input of the second frequency offset, which is transmitted from the second frequency offset estimator to the calculator; and a voltage controlled oscillator that compensates for a frequency offset according to the first frequency offset received from the calculator or the result that is obtained by adding the first frequency offset and the second frequency offset, controlling the switch when the first frequency offset is completely compensated, and allowing the second frequency offset to be input to the calculator, such that the first and second frequency offsets are added and compensated.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Figure 1:
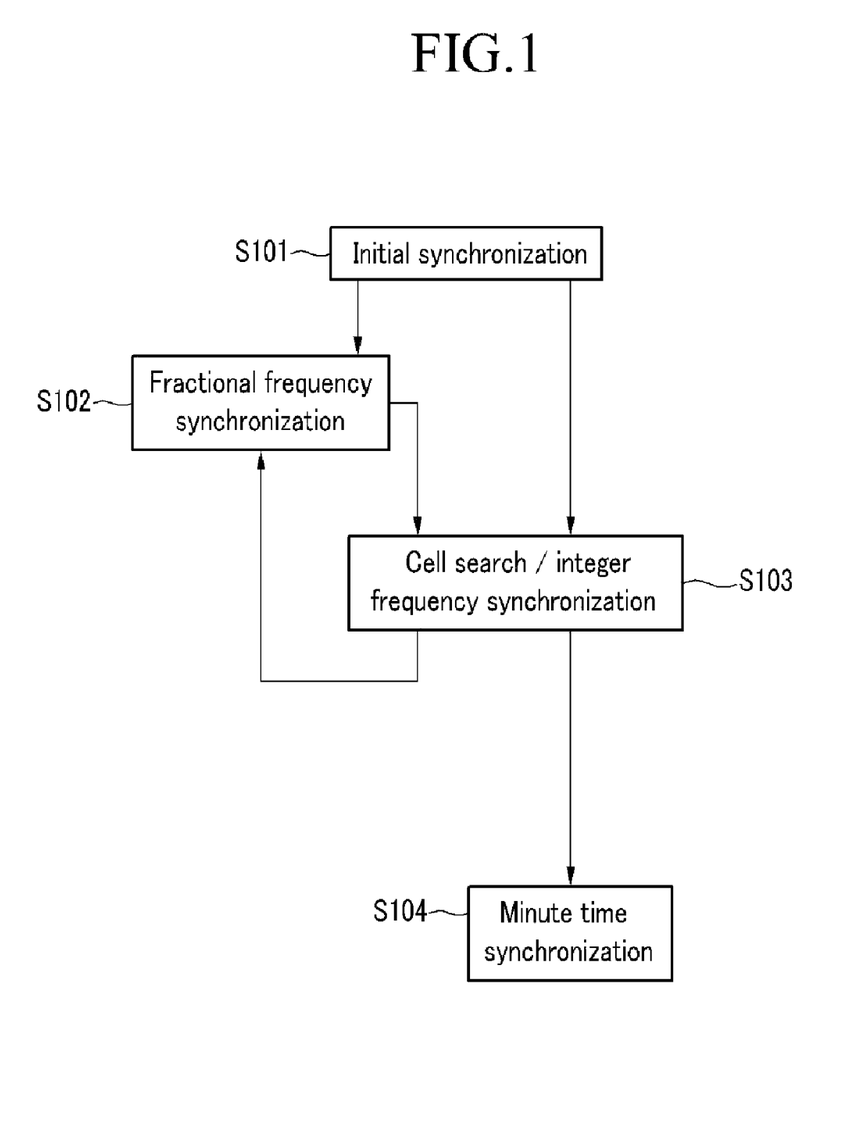
FIG. 1 is a flowchart simply illustrating a process of acquiring frequency synchronization in a receiver of an orthogonal frequency division multiple access system.

FIG. 1 is a flowchart simply illustrating a process of acquiring frequency synchronization in a receiver of an OFDMA system.

Referring to FIG. 1, a receiver performs an initial synchronization process (Step S101) on a received signal to acquire initial synchronization. The receiver estimates a fractional frequency offset and performs a fractional frequency synchronization process (Step S102) on the basis of the estimated fractional frequency offset. Then, the receiver searches a cell and estimates an integer frequency offset, and performs an integer frequency synchronization process (Step S103) at the same time as the fractional frequency synchronization process (Step S102).

Finally, if the fractional frequency synchronization process (Step S102) and the integer frequency synchronization process (Step S103) are completed, a minute time synchronization process (Step S104) is performed, thereby completing a synchronization process for demodulating the received signal.

A structure of the receiver that estimates the frequency offset using the method shown in FIG. 1 will be described with reference to FIG. 2.

Figure 2:
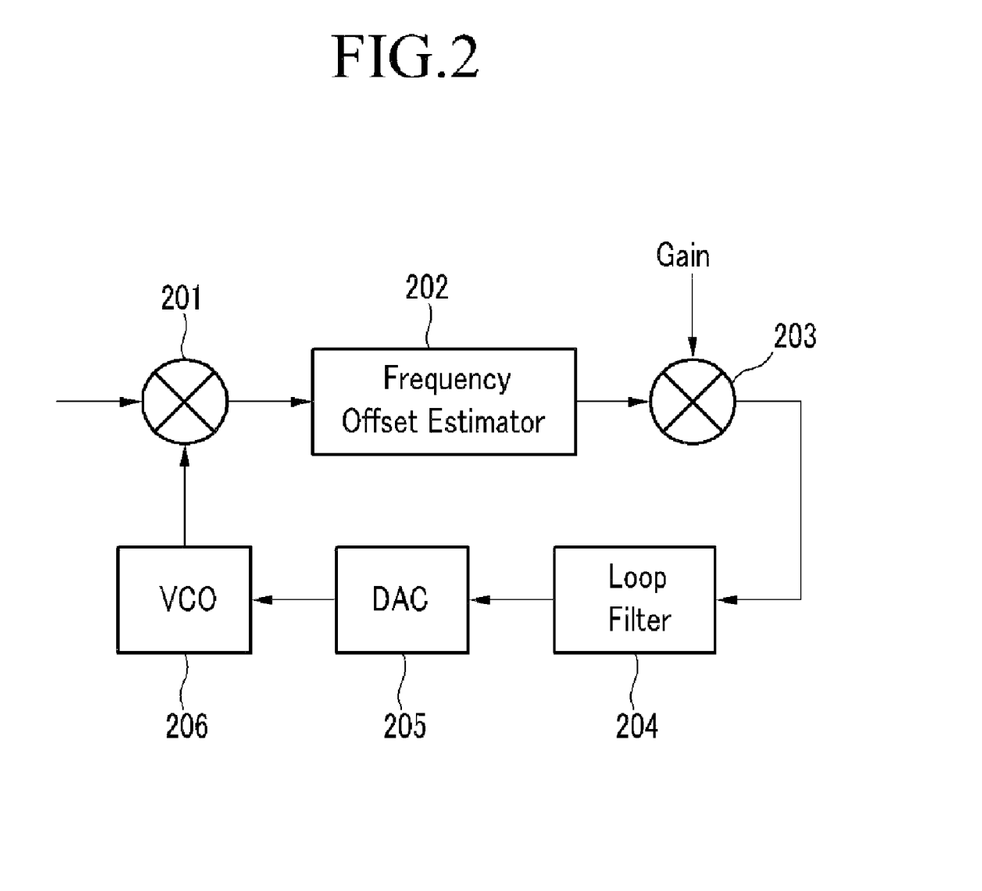
FIG. 2 is a configuration diagram illustrating a process of estimating a frequency offset in a receiver of an orthogonal frequency division multiple access system.

FIG. 2 is a configuration diagram illustrating a receiver of an OFDMA system that estimates a frequency offset.

Referring to FIG. 2, the receiver includes a plurality of multipliers 201 and 203, a frequency offset estimator 202, a loop filter 204, a digital-to-analog converter (DAC) 205, and a voltage controlled oscillator (VCO) 206.

The received signal is transmitted from a transmitter through the air and converted into a baseband signal, and includes a frequency offset. The received signal is input to the first multiplier 201. The frequency offset estimator 202 estimates the frequency offset of the received signal that has been input to the first multiplier 201. In this case, the frequency offset estimator 202 estimates a fractional frequency offset and an integer frequency offset.

The second multiplier 203 controls the estimated frequency offset with a predetermined gain. The estimated frequency offset is filtered by the loop filter 204 and input to the DAC 206. The DAC 206 converts a frequency offset that is in a digital form into a frequency offset that is in an analog form and outputs it to the voltage controlled oscillator 206.

The voltage controlled oscillator 206 compensates for the difference between the frequency of the received signal and a frequency of a signal output by an oscillator included in the receiver, on the basis of the frequency offset that is estimated by the frequency offset estimator 202.

Hereinafter, the auto-correlator and the cell detector of the receiver, which estimate the frequency offset, will be described with reference to FIGS. 3A and 3B.

Figure 3A:
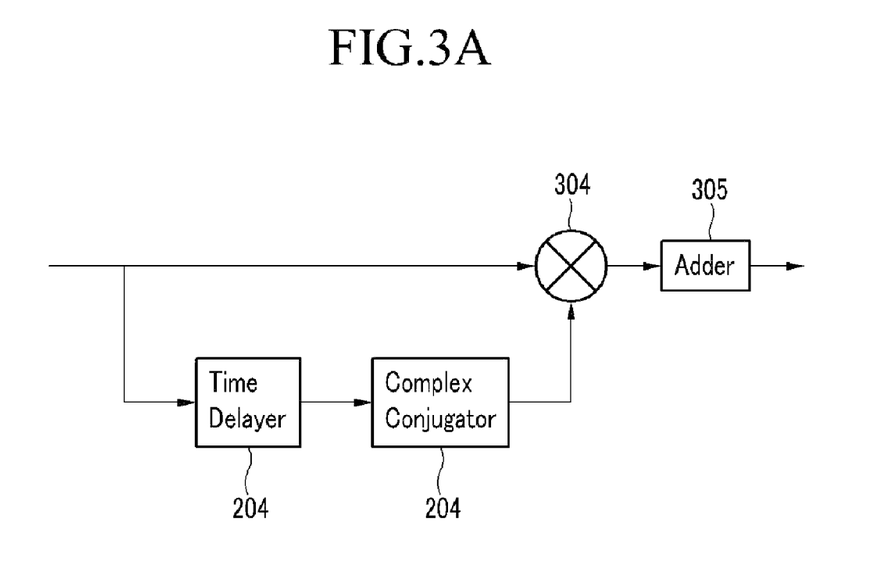
FIG. 3A is a view illustrating an auto-correlator that estimates a frequency offset according to an exemplary embodiment of the present invention.
Figure 3B:
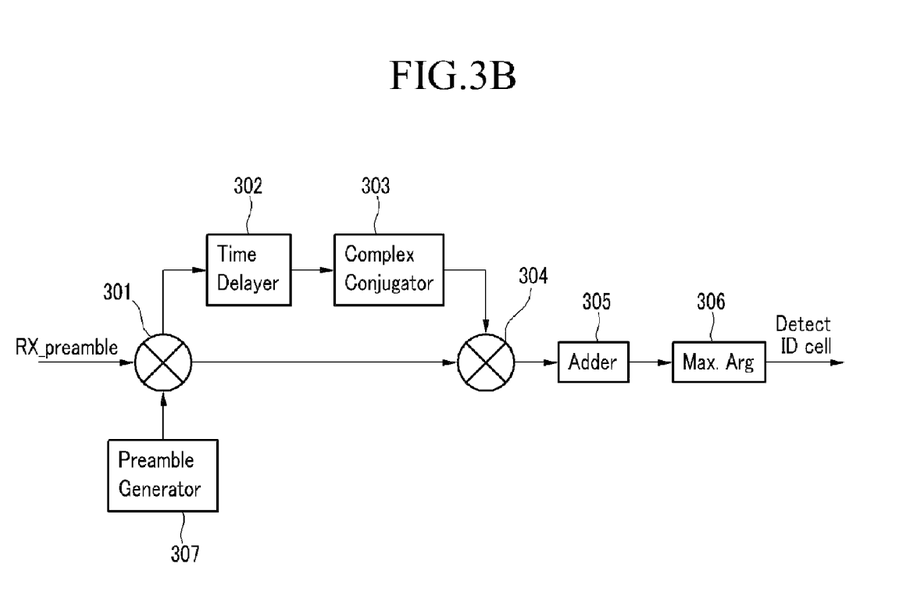
FIG. 3B is a view illustrating a cell detector that estimates a frequency offset according to an exemplary embodiment of the present invention.

FIG. 3A is a view illustrating an auto-correlator that estimates a frequency offset according to an exemplary embodiment of the present invention, and FIG. 3B is a view illustrating a cell detector that estimates a frequency offset according to an exemplary embodiment of the present invention.

Referring to FIG. 3A, the auto-correlator includes a time delayer 302, a complex conjugator 303, a third multiplier 304, and an adder 305. The auto-correlator stores the received signal in the time delayer 302 and outputs the received signal to the complex conjugator 303 after the received signal is delayed by a predetermined amount of delay time.

The complex conjugator 303 conjugates the received signal to generate a complex conjugate, and outputs the complex conjugate to the third multiplier 304. The third multiplier 304 multiplies the received signal and the signal output by the complex conjugator 303 and outputs the multiplication result to the adder 305.

In addition, the adder 305 accumulates the signal output by the third multiplier 304 during an OFDMA symbol period and detects an offset when an auto-correlation value has a maximum value, that is, an offset having a maximum auto-correlation value.

The cell detector that is shown in FIG. 3B includes a preamble generator 307, a fourth multiplier 301, a time delayer 302, an adder 305, and a Max. Arg 306.

The preamble generator 307 generates codes for all possible cases of the preamble signal. The fourth multiplier 301 multiplies the code generated by the preamble generator 307 and the received signal having been subjected to a fast Fourier transform (FFT), and stores the multiplication result in the time delayer 302.

After delaying the received signal by a predetermined amount of delay time, the time delayer 302 outputs the received signal to the complex conjugator 303. The complex conjugator 303 conjugates the received signal to generate a complex conjugate, and outputs the complex conjugate to the third multiplier 304. The third multiplier 304 multiplies the received signal and the signal output by the complex conjugator 303 and outputs the multiplication result to the adder 305.

In addition, the adder 305 accumulates the signal output by the third multiplier 304 during an OFDMA symbol period. Then, when the auto-correlation value has a maximum value, the adder 305 outputs the maximum value to the Max. Arg 306. The Max. Arg 306 receives the maximum value output by the adder 305 and outputs a phase of a complex signal. At this time, the Max. Arg 306 outputs the frequency offset.

That is, FIG. 3B shows a structure of a cell detector that estimates an ID cell of a downlink preamble signal. The preamble generator 307 generates codes for all possible cases of the preamble signal in a frequency domain, calculates cross-correlation values between the codes and the received signals, and searches a maximum value of the cross-correlation values from the Max. Arg 306.

Accordingly, since the integer frequency offset has a shift characteristic in the frequency domain, in such a manner that a plurality of cell detectors are operated in parallel and a peak value of the plurality of cell detectors is searched, the ID cell can be searched while the fractional frequency offset can be estimated.

In general, the frequency offset is divided into an integer offset and a fractional offset. Each of the integer offset and the fractional offset is individually estimated in order to maximize offset estimating performance. The integer frequency offset is estimated by using test symbols that are already recognized by a transceiver. The integer frequency offset may be estimated in a different method according to the arrangement and structure of the test symbols. However, a method is generally used in which the received symbols in the frequency domain and the test symbols allocated to specific locations are sequentially rotatably shifted every time and the correlation is calculated.

Methods of estimating a fractional frequency offset are largely divided into a method of estimating a fractional frequency offset using autocorrelation and a method of estimating a fractional frequency offset using CP. The autocorrelation method is represented by a Moose algorithm. According to the Moose algorithm, two OFDM symbols, which are the same, are transmitted without a guard interval, and a frequency offset is estimated. In the exemplary embodiment of the present invention, a description is first given to an apparatus for estimating and compensating for a fractional frequency offset and an integer frequency offset in a receiver of an OFDMA system. The structure of the apparatus is as shown in FIG. 4.

Figure 4:
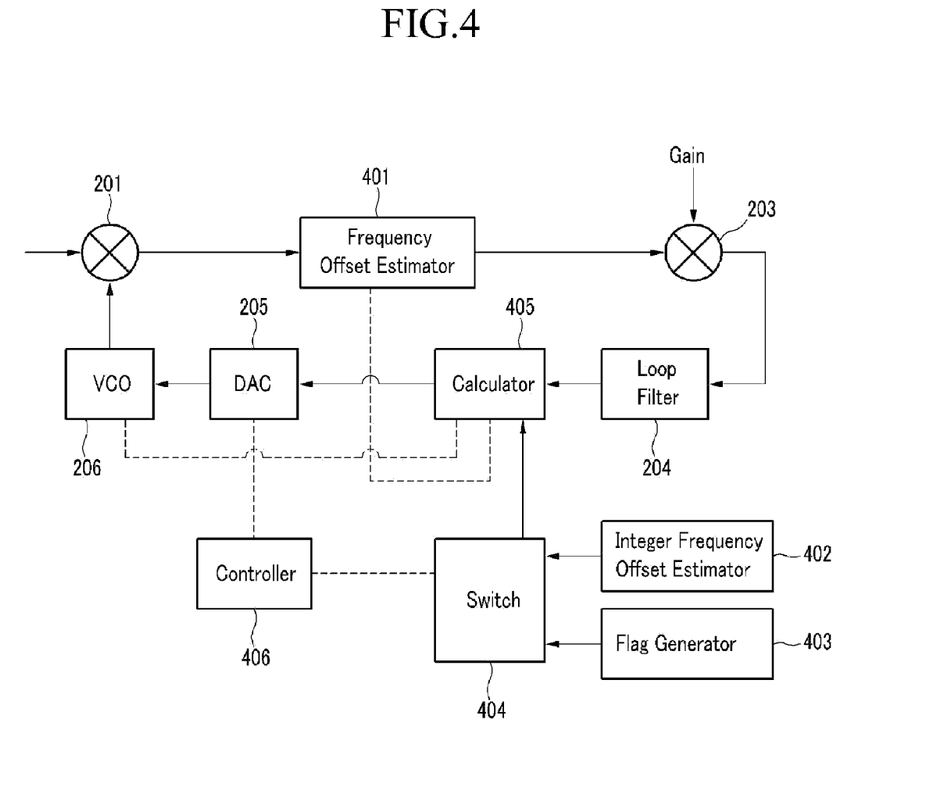
FIG. 4 is a configuration diagram illustrating an apparatus for compensating for a frequency offset in a receiver of an orthogonal frequency division multiple access system according to an exemplary embodiment of the present invention.

FIG. 4 is a block diagram illustrating an apparatus for compensating for a frequency offset in a receiver of an orthogonal frequency division multiple access system according to an exemplary embodiment of the present invention.

Referring to FIG. 4, the receiver according to the exemplary embodiment of the present invention further includes a fractional frequency offset estimator 401, an integer frequency offset estimator 402, a flag generator 403, a switch 404, a calculator 405, and a controller 406, in addition to the constituent elements of the receiver that is shown in FIG. 2.

The received signal is transmitted from the transmitter through the air and converted into a baseband signal, and includes a frequency offset. The received signal is input to the first multiplier 201. The fractional frequency offset estimator 401 estimates a fractional frequency offset for the received signal that has been input to the first multiplier 201. At this time, the fractional frequency offset is controlled by the second multiplier 203 with a predetermined gain and is then filtered by the loop filter 204. Meanwhile, the integer frequency offset estimator 402 estimates an integer frequency offset.

The following Table 1 shows the result that is obtained by estimating a frequency offset by using the receiver according to the exemplary embodiment of the present invention.

TABLE 1

| Frequency offset range | Integer frequency offset estimated result | Fractional frequency offset estimated result |
| --- | --- | --- |
| $|\Delta f| \leq f_b/2$ | 0 | $|\Delta f|$ |
| $f_b/2 \leq |\Delta f| \leq f_b$ | ±1 | $\mp(f_b - |\Delta f|)$ |

In this case, $\Delta f$ denotes a frequency offset, and $f_b$ denotes a subcarrier frequency interval of an OFDMA system.

As represented by Table 1, if the frequency offset is within a range of $\pm f_b/2$, the integer frequency offset estimated result is 0 and the fractional frequency offset estimated result is estimated by the frequency offset. However, if the frequency offset is within a range of $f_b/2 \leq |\Delta f| \leq f_b$, the integer frequency offset estimated result is ±1 and the fractional frequency offset converges into $\mp(f_b-|\Delta f|)$. Accordingly, the integer frequency offset estimated result and the fractional frequency offset estimated value need to be added.

In addition, the controller 406 controls a switching operation performed by the switch 404 in accordance with the fractional frequency offset and the integer frequency offset that are estimated by the fractional frequency offset estimator 402 and the integer frequency offset estimator 403, respectively.

If the integer frequency offset estimator 402 estimates the integer frequency offset, the controller 406 controls the switch 404 to allow the estimated integer frequency offset to be input to the calculator 405. In addition, the controller 406 controls the flag generator 403, such that the fractional frequency offset and the integer frequency offset, which have been estimated by separate constituent elements, respectively, are input to the calculator 405, and the fractional and integer frequency offsets are compensated.

Further, the controller 406 compares the fractional frequency offset value, which is currently estimated by the fractional frequency offset estimator 401, and the previously estimated fractional frequency offset value. As the result of the comparison, if a state where the currently estimated fractional frequency offset value is smaller than a predetermined frequency value (X Hz) is maintained during predetermined frames, the controller 406 determines that the fractional frequency offset is completely compensated, and generates a compensation completion flag (e.g., '1').

If the integer frequency offset estimator 402 estimates the integer frequency offset, the controller 406 generates an estimation completion flag (e.g., '1'), and allows the fractional and integer frequency offsets to be input to a voltage control generator through the calculator 405 according to the generated estimation completion flag.

Specifically, if the fractional frequency offset is completely compensated, that is, the integer frequency offset is estimated in a state where the compensation completion flag is generated, the controller 406 controls a switching operation performed by the switch 404 to allow the integer frequency offset to be input to the calculator 405, thereby compensating for the integer frequency offset. In addition, the controller 406 generates an estimation standby flag (e.g., '0') after the integer frequency offset is compensated.

Meanwhile, the flag generator 403 generates an estimation completion flag if the integer frequency offset estimator 402 estimates an integer frequency offset. If the flag generator 403 generates the estimation completion flag, the switch 404 can perform a switching operation such that the integer frequency offset is input to the calculator 405.

That is, the apparatus for compensating for a frequency offset according to the exemplary embodiment of the present invention estimates the fractional frequency offset and the integer frequency offset by using separate constituent elements. If one frequency offset is completely compensated, the other frequency offset can be compensated. Therefore, the apparatus for compensating for a frequency offset can efficiently estimate and compensate for the frequency offsets.

The calculator 405 receives the fractional frequency offset, which is estimated by the fractional frequency offset estimator 401, and the integer frequency offset, which is estimated by the integer frequency offset estimator 402. Then, the calculator 405 calculates the frequency offset, which needs to be compensated, and outputs it to the DAC 205.

In addition, the calculator 405 adds the fractional frequency offset, which has passed through the loop filter 204, and the integer frequency offset, which has not passed through the loop filter 204. The calculator 405 provides the added result between the fractional frequency offset and the integer frequency offset as the frequency offset compensation value to the voltage controlled oscillator 206.

The voltage controlled oscillator 206 compensates for the frequency offset obtained by adding the fractional frequency offset and the integer frequency offset, which is output by the calculator 405.

A method of compensating for a frequency offset using the above-described receiver will be described in detail with reference to FIG. 5.

Figure 5:
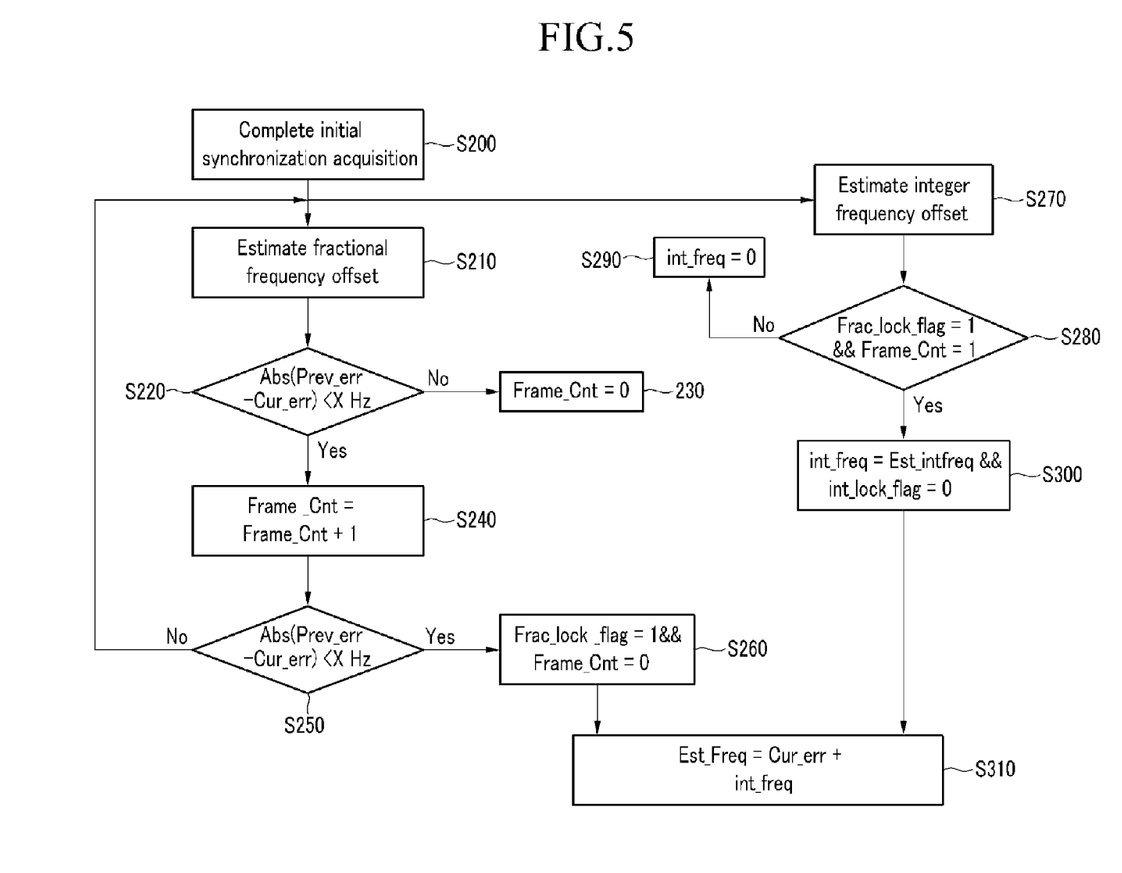
FIG. 5 is a flowchart illustrating a process of when a receiver of an orthogonal frequency division multiple access system according to an exemplary embodiment of the present invention compensates for a frequency offset.

FIG. 5 is a flowchart illustrating a method in which a receiver of an orthogonal frequency division multiple access system according to an exemplary embodiment of the present invention compensates for a frequency offset.

Referring to FIG. 5, the receiver acquires initial frequency synchronization of the received signal that is transmitted from the transmitter (Step S200). If the frequency synchronization is acquired, the receiver estimates the fractional frequency offset (Step S210), and confirms whether the difference between the currently estimated fractional frequency offset value Cur_err and the previously estimated fractional frequency offset value Prev_err is smaller than a predetermined frequency reference value (X Hz) that is set in advance (Abs (Prev_err−Cur_err)<X Hz) (Step S220).

If the difference between the currently estimated fractional frequency offset value and the previously estimated fractional frequency offset value is larger than the predetermined frequency reference value, the receiver initializes a value for the number of frames according to the received signal (Frame_Cnt=0) (Step 230). However, if the difference between the two offset values is smaller than the frequency reference value, the receiver counts the number of frames (Frame_Cnt=Frame_Cnt+1) (Step S240).

Then, the receiver compares the number of frames to be counted and the predetermined number of frames FN (Frame_Cnt=FN) (Step S250). As the result of the comparison, the value for the number of frames, which is received in a state where the difference between the value for the number of frames and the reference value is smaller than the frequency reference value, becomes equal to the reference value.

In this case, since the fractional frequency offset is completely compensated, the compensation completion flag is generated, and the value for the number of frames is initialized (Frac_lock_flag=1 && Frame_Cnt=0) (Step S260).

Then, the integer frequency offset is estimated (Step S270), and if the integer frequency offset is completely estimated, the estimation completion flag (int_lock_flag=1) is generated. At this time, it is confirmed whether the integer frequency offset is estimated in a state where the compensation completion flag is generated (Frac_lock_flag=1 && Int_lock_flag=1) (Step S280).

If the fractional frequency offset is not completely compensated, that is, the compensation completion flag is not generated, the receiver does not compensate for the integer frequency offset (Int_freq=0) (Step S290). That is, the receiver does not compensate for the estimated integer frequency offset.

However, if the integer frequency offset is estimated in a state where the compensation completion flag is generated, that is, the integer frequency offset is estimated in a state where the fractional frequency offset is completely compensated, the receiver compensates for the integer frequency offset, and generates the estimation standby flag (int_lock_flag=0) (Int_freq=Est_intfreq && Int_lock_flag=0) (Step S300).

Accordingly, the receiver can compensate for both the estimated fractional frequency offset and the estimated integer frequency offset (Est_Freq=Cur_err+Int_freq) (Step S310).

That is, in the OFDMA system according to the exemplary embodiment of the present invention, if the fractional frequency offset is completely compensated, the receiver allows the integer frequency offset to be applied once and compensates for the integer frequency offset. Accordingly, the receiver can efficiently compensate for the frequency offsets.

The result, which has been obtained by estimating the frequency offset by the receiver in the above-described method, will be described with reference to FIGS. 6A and 6B.

Figure 6A:
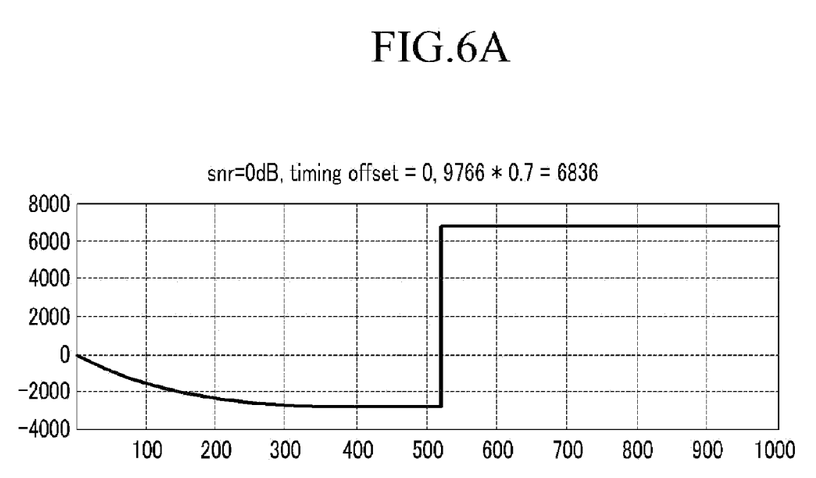
FIGS. 6A and 6B are views illustrating the result that is obtained by estimating a frequency offset by a receiver of an orthogonal frequency division multiple access system according to an exemplary embodiment of the present invention.
Figure 6B:
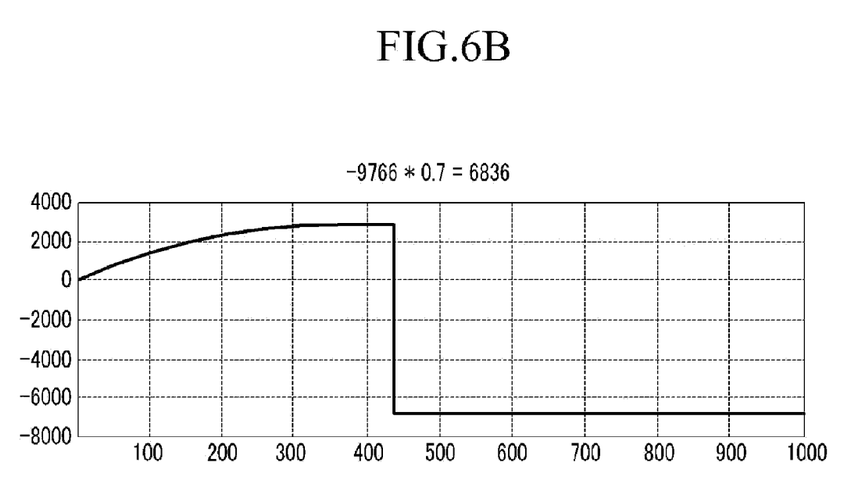

FIGS. 6A and 6B are views illustrating the result that is obtained by estimating a frequency offset by a receiver of an OFDMA system according to an exemplary embodiment of the present invention.

FIG. 6A exemplifies a case where a subcarrier interval $f_b$ is 9766 Hz and a frequency offset Δf of a received signal is 6836 Hz in an OFDMA system according to an exemplary embodiment of the present invention, and FIG. 6B exemplifies the result that is obtained by compensating for a frequency offset Δf in the case where the frequency offset Δf is 6836 Hz.

In the exemplary embodiment of the present invention that has been described above, the description is given to the case where, after estimating and compensating for the fractional frequency offset, the integer frequency offset is estimated and compensated. However, the present invention can be used in the case where, after estimating and compensating for the integer frequency offset, the fractional frequency offset is estimated and compensated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, since each of the fractional frequency offset and the integer frequency offset is individually estimated, it is possible to efficiently compensate for the estimated fractional and integer frequency offsets.

What is claimed is:

1. A method of estimating a frequency offset for a downlink frame, the method comprising:

estimating a fractional frequency offset and an integer frequency offset of a received signal, respectively;

compensating for the estimated fractional frequency offset and determining whether the integer frequency offset is completely estimated; and compensating for the integer frequency offset on the basis of the compensated fractional frequency offset when the integer frequency offset is completely estimated, adding the compensated fractional frequency offset and the compensated integer frequency offset, and compensating for an entire frequency offset for the received signal on the basis of a result of the addition of the compensated fractional frequency offset and the compensated integer frequency offset, wherein the determining of whether the integer frequency offset is completely estimated includes:

calculating a value that is obtained by subtracting the fractional frequency offset by a previously estimated fractional frequency offset before estimating the fractional frequency offset;

comparing the calculated value and a predetermined frequency reference value;

setting the number of frames according to the result of the comparison; and determining whether the integer frequency offset is completely estimated.

2. The method of claim 1, wherein the comparing of the calculated value and the predetermined frequency reference value includes:

counting, when a value that corresponds to the difference between the calculated value and the predetermined frequency reference value is smaller than the predetermined frequency reference value, the number of frames corresponding to the received signal, and initializing, when the value is larger than the predetermined frequency reference value, the number of frames.

3. The method of claim 1, wherein the setting of the number of frames includes determining, when the set number of frames is the same as the predetermined number of frames, that the fractional frequency offset is completely compensated, and initializing the number of frames.

4. A method of estimating a frequency offset for a downlink frame, the method comprising:

estimating a fractional frequency offset and an integer frequency offset of a received signal, respectively;

compensating for the estimated fractional frequency offset and determining whether the integer frequency offset is completely estimated; and compensating for the integer frequency offset on the basis of the compensated fractional frequency offset when the integer frequency offset is completely estimated, and compensating for an entire frequency offset for the received signal on the basis of the compensated result, wherein the compensating of the entire frequency offset includes:

generating, when the integer frequency offset is estimated, an estimation completion flag;

determining, when the estimation completion flag is generated, whether a compensation completion flag is generated, which is generated when the fractional frequency offset is completely compensated; and compensating for the integer frequency offset when the compensation completion flag is generated, and compensating for the entire frequency offset on the basis of the compensated integer frequency offset.

5. The method of claim 4, further comprising initializing, when the compensation completion flag is not generated, the integer frequency offset so as to cause the integer frequency offset to not be compensated.

6. The method of claim 5, wherein, when the estimation completion flag is generated in a state where the compensation completion flag is not generated, an estimation standby flag is generated.

7. The method of claim 4, wherein the entire frequency offset is compensated by adding the compensated fractional frequency offset and the compensated integer frequency offset.

8. An apparatus for compensating for a frequency offset, the apparatus comprising:

a first frequency offset estimator that estimates a first frequency offset;

a second frequency offset estimator that estimates a second frequency offset;

a calculator that adds the first frequency offset and the second frequency offset to be estimated;

a switch that is located between the second frequency offset estimator and the calculator and that switches input of the second frequency offset, which is transmitted from the second frequency offset estimator to the calculator;

a voltage controlled oscillator that compensates for a frequency offset according to the first frequency offset received from the calculator or the result that is obtained by adding the first frequency offset and the second frequency offset; and a controller that controls the switch when the first frequency offset is completely compensated, and allows the second frequency offset to be input to the calculator, such that the first and second frequency offsets are added and compensated.

9. The apparatus of claim 8, further comprising:

a loop filter that is located at an output side of the first frequency offset estimator and performs loop filtering on the first frequency offset; and a flag generator that generates a flag under control of the controller.

10. The apparatus of claim 9, wherein the first frequency offset is subjected to loop filtering by the loop filter and is input to the calculator, and the second frequency offset is input to the calculator through the switch.

11. The apparatus of claim 8, wherein:

when the first frequency offset is completely compensated, a compensation completion flag is generated by controlling a flag generator;

when the second frequency offset is estimated, an estimation completion flag is generated; and when both the compensation completion flag and the estimation completion flag are generated, the second frequency offset is allowed to be input to the calculator by controlling the switch.

12. The apparatus of claim 11, wherein when the compensation completion flag is not generated in a state where the estimation completion flag is generated, the second frequency offset is initialized.

13. The apparatus of claim 12, wherein:

when the difference between the first frequency offset, which is currently estimated by the first frequency offset estimator, and a previously estimated first frequency offset is smaller than a predetermined frequency reference value, the number of frames corresponding to the received signal is counted;

when the difference is larger than the predetermined frequency reference value, the number of frames is initialized; and when the number of frames is the same as the predetermined number of frames, it is determined that the first frequency offset is completely compensated, and the number of frames is initialized.

* * * * *